(12) United States Patent
Liu et al.

(10) Patent No.: US 8,948,965 B2
(45) Date of Patent: Feb. 3, 2015

(54) ELECTRONIC PARKING BRAKE SYSTEM, ASSISTANT STARTING METHOD THEREOF FOR MOTOR VEHICLE

(75) Inventors: Zhaoyong Liu, Wuhu (CN); Yongbin Yuan, Wuhu (CN); Qindong Gu, Wuhu (CN); Sheng Zhang, Wuhu (CN); Liping Liu, Wuhu (CN); Yulin Qiang, Wuhu (CN)

(73) Assignee: Wuhu Bethel Automotive Safety Systems Co. Ltd., Wuhu, Anhui (CN)

( * ) Notice: Subject to any disclaimer, the term of this patent is extended or adjusted under 35 U.S.C. 154(b) by 133 days.

(21) Appl. No.: 13/701,812

(22) PCT Filed: Dec. 20, 2010

(86) PCT No.: PCT/CN2010/080003
§ 371 (c)(1),
(2), (4) Date: Dec. 3, 2012

(87) PCT Pub. No.: WO2012/019408
PCT Pub. Date: Feb. 16, 2012

(65) Prior Publication Data
US 2013/0073163 A1 Mar. 21, 2013

(30) Foreign Application Priority Data
Aug. 13, 2010 (CN) .......................... 2010 1 0258952

(51) Int. Cl.
*G06F 17/00* (2006.01)
*G06F 19/00* (2011.01)
(Continued)

(52) U.S. Cl.
CPC . *B60T 7/12* (2013.01); *B60T 7/042* (2013.01); *B60W 30/18027* (2013.01);
(Continued)

(58) Field of Classification Search
CPC . B60W 10/18; B60W 10/182; B60W 254/10; B60W 30/18027; B60W 2510/0275; B60T 7/042; B60T 7/12; B60T 2540/14
USPC ........... 701/36, 48, 49, 70, 71, 74, 76, 78, 80; 180/271, 282, 65.275; 340/438, 439, 340/440; 303/191, 192
See application file for complete search history.

(56) References Cited

U.S. PATENT DOCUMENTS
4,629,043 A * 12/1986 Matsuo et al. ................ 477/184
(Continued)

FOREIGN PATENT DOCUMENTS
CN 1704302 12/2005
CN 101678832 3/2010
(Continued)

OTHER PUBLICATIONS
International Search Report mailed May 19, 2011 which issued in corresponding International Patent Application No. PCT/CN2010/080003 (6 pages).
(Continued)

*Primary Examiner* — Thomas Tarcza
*Assistant Examiner* — Edward Pipala
(74) *Attorney, Agent, or Firm* — Nixon Peabody LLP

(57) ABSTRACT
An electronic parking brake system and assistant starting method thereof for a motor vehicle are provided, wherein, the electronic parking brake system receives a plurality of sensor signals indicative of vehicle condition and releases the electronic parking brake when any one of the plurality of sensor signals indicates a predetermined condition to assist the driver, the conditions including a relation between a torque transmitted by a clutch and a torque needed for starting the motor vehicle, an engine rotational speed being greater than an engine idle speed and simultaneous depression of the accelerator and clutch pedals, a starting trend, a detected engine rotational speed lower than a threshold value calculated according to a throttle opening data, and a detected rotational speed or angle of driving wheel greater than a predetermined threshold value, thereby providing a method and system adapted to accurately judge whether the brake can be automatically released.

20 Claims, 2 Drawing Sheets

(51) Int. Cl.
  *B60T 7/12* (2006.01)
  *G06F 7/00* (2006.01)
  *B60T 7/04* (2006.01)
  *B60W 30/18* (2012.01)
  *B60W 10/18* (2012.01)

(52) U.S. Cl.
  CPC ............ *B60W 10/182* (2013.01); *B60W 10/18* (2013.01); *B60W 2510/0275* (2013.01); *B60W 2510/0638* (2013.01); *B60W 2540/10* (2013.01); *B60W 2540/14* (2013.01)
  USPC ................ 701/36; 701/70; 180/271; 303/191

(56) References Cited

U.S. PATENT DOCUMENTS

| | | | |
|---|---|---|---|
| 5,417,624 A * | 5/1995 | Weissbrich et al. | 477/71 |
| 6,009,984 A * | 1/2000 | Zechmann et al. | 188/353 |
| 2006/0049691 A1 | 3/2006 | Deprez et al. | |
| 2009/0187324 A1 | 7/2009 | Lu et al. | |

FOREIGN PATENT DOCUMENTS

| | | |
|---|---|---|
| FR | 2828450 | 2/2003 |
| FR | 2923791 | 5/2009 |
| GB | 1454628 | 11/1976 |
| JP | 61249858 | 11/1986 |
| JP | 1275244 | 11/1989 |
| JP | 2005529795 | 10/2005 |
| JP | 2005306071 | 11/2005 |
| JP | 2007127155 | 5/2007 |
| JP | 2007182141 | 7/2007 |
| JP | 201058623 | 3/2010 |

OTHER PUBLICATIONS

Written Opinion mailed May 19, 2011 which issued in corresponding International Patent Application No. PCT/CN2010/080003 (4 pages).

Extended European Search Report dated Jan. 30, 2014, which issued in corresponding International Patent Application No. PCT/CN2010/080003 (6 pages).

* cited by examiner

ELECTRONIC PARKING BRAKE SYSTEM, ASSISTANT STARTING METHOD THEREOF FOR MOTOR VEHICLE

CROSS-REFERENCE TO RELATED APPLICATIONS

This application is a U.S. national stage of International Patent Application No. PCT/CN2010/080003, filed Dec. 20, 2010, which claims priority of Chinese Patent Application No. 201010258952.5, filed on Aug. 13, 2010, the contents of which are each incorporated herein by reference in its entirety.

FIELD OF THE INVENTION

The present invention relates to the technical field of the manufacturing of brake system for motor vehicle, and in particular relates to an electronic parking brake system and assistant starting method thereof for a motor vehicle.

BACKGROUND OF THE PRIOR ART

According to the conditions of road and traffic, a driver may use a series of special devices mounted on the motor vehicle to force the road surface to apply definite external force on the motor vehicle wheels in the direction being opposite to the running direction of the motor vehicle, thus generating forced brake on the motor vehicle to certain extent. Such controllable external force for braking the motor vehicle is called as braking force, and a series of special devices used for generating the braking force are called as brake system. In terms of functions, the braking systems are classified into two types, namely the service brake system and the parking brake system. The service brake system refers to a series of devices designed to allow the running motor vehicle to speed down or even stop, acting as the major brake system for the motor vehicle. The parking brake system refers to the device designed to maintain the standstill state of the motor vehicle in parking, playing the role as the auxiliary brake system for the motor vehicle.

According to different braking energy sources, the parking brake system is also divided into two types, namely the traditional mechanical type parking brake system and the electronic parking brake system. In the application of the mechanical type parking brake system, the parking brake pull rod is manipulated by the driver, and the parking brake pull rod drives the brake drum to open up or drives the braking caliper piston to move to complete parking. In such case, the braking force is completely originated from the driver. Since different drivers may apply different forces, it is very likely that insufficient braking force may be caused, leading to the risk of slipping.

The mechanical type parking brake system may have many inconveniences in operation, manly including: at the time of starting the motor vehicle, the driver is not only required to control the steering as well as the accelerator pedal and the clutch, and is also required to release the parking brake pull rod, so that the starting operations become very complicated. Such complicated operations are particularly reflected in the starting on a slope. In such case, the driver is also required to select the opportunity to release the parking brake pull rod. If the parking brake pull rod is released too soon, the risk of slipping along the slope will be generated; if it is released too late, flame-out of the engine will be caused.

To overcome said technical problems in the traditional mechanical type parking brake system, electrical parking brake (EPB for short) system applied in the motor vehicle has been developed in the prior art.

EPB system is designed to apply the braking force through the motor. In the process of parking, the driver is merely required to press the parking button, and the controller of EPB system will control the rotate of the motor and thus complete parking. It can always apply the maximal pressing force. Furthermore, EPB system can also make communication with the other control modules of vehicle (such as engine controller, ABS/ESP controller and vehicle body controller), so as to realize the function of automatic parking/automatic release, simplify the driver's operations and ensure the safety and comfort level in driving.

However, it is difficult to judge the conditions for realizing automatic release in EPB system, because it is necessary to consider the potential safety hazards that may occur in the process of release. Neither the sliding slope resulted from premature release nor the flame-out of engine/even the damage of the transmission system due to too late automatic release is allowed. To judge whether automatic release is feasible, it is critical to know whether the power of the engine has been transmitted to the wheels and whether such power is sufficient to ensure that the sliding slope will not occur.

To solve said technical problems, Germany Lucus Automobile Co., Ltd has successively disclosed two Chinese patent applications, namely "A parking brake and a control method thereof" (Application number: 200480038712.7) and "A method for operating the braking device of vehicle" (Application number: 200580003615.9). While China Zhejiang Asia-Pacific Mechanical & Electronic Co., Ltd disclosed a Chinese patent "Control Method of Automobile Electric Control Parking and Start Assisting By Manual Transmission And System Thereof" (Application number: 200910097642.7). In the technical solution published by this patent application, it is necessary to add some sensors, such as clutch position sensor and gear position sensor (such as position switch), to realize the automatic release control of parking. Through the combined information of the clutch position transducer and the gear position sensor, it is feasible to judge whether the power of the engine has been transmitted to the wheels. However, this system involves many technical problems in practical application.

1. EPB system must depend on the gear position sensor and the clutch position transducer on the motor vehicle, otherwise it is neither impossible to obtain the clutch position and gear position information nor know whether the power has been transmitted to the wheels.

2. In order to additionally mount the clutch position sensor and the gear position sensor, it is required to redesign the clutch operating device and the gear shifting operating mechanism.

3. Increase cost.

4. Since the friction disc will gradually wear off in the application of the clutch, and its engagement point is also constantly changing, the error of the clutch position sensor will become increasingly higher. As a result, EPB system will easily make a mistake in judging the driving intention of the driver. Therefore, when the automatic parking is released, misjudgment and misoperation will still occur. Upon occurrence of misoperation, the condition of sliding slope or flame-out of the engine will occur. Furthermore, the service life of the clutch will be greatly reduced over the long-term.

SUMMARY OF THE INVENTION

With view of the deficiencies in the prior art, it is the technical objective of the present invention to provide an electronic parking brake system and assistant starting method thereof for a motor vehicle. Based on the original structure of the motor vehicle, the present invention can realize automatic release of the motor vehicle and assistant starting without need for making any transformation.

In order to address said technical problems, the present invention provides an assistant starting method of electronic parking brake system for a motor vehicle, the electronic parking brake system receives all sensor signals and detection signals of the motor vehicle; when any one of the following conditions is satisfied, the brake will be released to assist a driver in starting:

Condition (1): a torque $T_c$ transmitted by a clutch is calculated, and the calculated torque $T_c$ transmitted by the clutch is greater than a torque $T_c$ needed for starting the motor vehicle;

Condition (2): an engine rotate speed is greater than an engine idle speed, and an accelerator pedal and a clutch pedal are depressed simultaneously;

Condition (3): starting trend of the motor vehicle is detected;

Condition (4): the detected engine rotate speed is lower than a first predetermined threshold value calculated according to a throttle opening data;

Condition (5): a detected rotate speed or angle of a driving wheel is greater than a predetermined threshold value of rotate speed or angle.

The present invention also provides an electronic parking brake system for a motor vehicle, comprising an EPB controller and an actuating mechanism; the EPB controller also comprises a main control module and a CAN interface module, wherein the main control module includes a main control unit, a storage unit and one or more of calculation units;

wherein, the CAN interface module is designed to transmit signals or commands between the motor vehicle body CAN bus and the main control unit;

according to the received sensor signals or the detection signals, the main control unit judges the type of the sensor signals or the detection signals, selects the corresponding calculation unit to make calculation; according to the calculated results obtained by the calculation unit or the sensor signals or detection signals received by the main control unit, the main control unit determines whether the current motor vehicle meets the condition for releasing the brake; when the condition for releasing the brake is satisfied, the main control unit controls the actuating mechanism to operate and thus release the braking completed by the parking brake system; or through the CAN interface module, the main control unit sends to the ESP system of the motor vehicle by way of the vehicle body CAN bus the command to release the braking pipeline pressure, so as to release the braking completed by ESP system;

according to the sensor signals or the detection signals sent by the main control unit as well as the relevant parameters in the storage unit, the one or more of calculation units make calculation, and the calculated results are provided to the main control unit to determine whether the condition for releasing brake is satisfied.

Through said technical solutions provided by the present invention, it is feasible to effectively overcome the following technical problems: on a motor vehicle without gear position sensor and clutch sensor, EPB cannot obtain the signal "whether the power has been transmitted to the wheels"; after the clutch position sensor and the gear position sensor have been additionally mounted, the cost is increased; big error of clutch position sensor may result in misjudgment by EPB; the life of the clutch is greatly reduced; Furthermore, the present invention also has the following advantages:

1. Low system cost. The system has no further need for clutch sensor and gear position sensor, and there is no need to make structural transformation, so that the manufacturing cost is saved.

2. In most cases, the present invention may use the clutch pedal signal and the acceleration pedal signal to automatically confirm the driving intention of the driver, so that the parking brake can be released before the combination of the clutch, the service life of the clutch is extended, and the corresponding time for parking release is reduced.

2. The system has good adaptability. Except for that this system should be connected with the motor vehicle bus, there is no need to add any peripheral component. This system can be installed and put into use only after small change is made to the algorithm of the controller, without any need for redesigning the clutch control mechanism and the gear shift mechanism.

3. In the electronic parking system with the clutch sensor, along with the abrasion of the clutch, it is required to make regular calibration on the clutch sensor, otherwise misjudgment will occur. However, since the present invention is not provided with the clutch sensor, it is not necessary to make regular calibration on the clutch.

4. At the time of starting the motor vehicle, the driver can complete the starting by merely controlling the clutch and the accelerator pedal, without need for manipulating the parking brake bar. As a result, the operations of the driver are simplified; Furthermore, at the time of starting on slope, the phenomenon of sliding slope or flame-out of the engine will not be caused.

DESCRIPTION OF ATTACHED DRAWINGS

Figure 1:
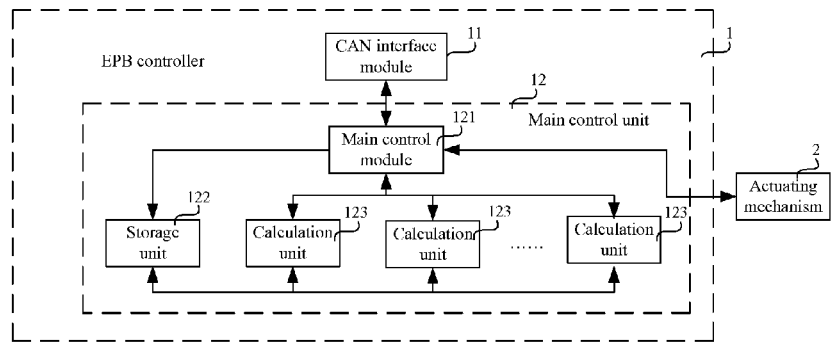
FIG. 1 is the structure diagram illustrating an embodiment of the electronic parking brake system for a motor vehicle of the present invention.
Figure 2:
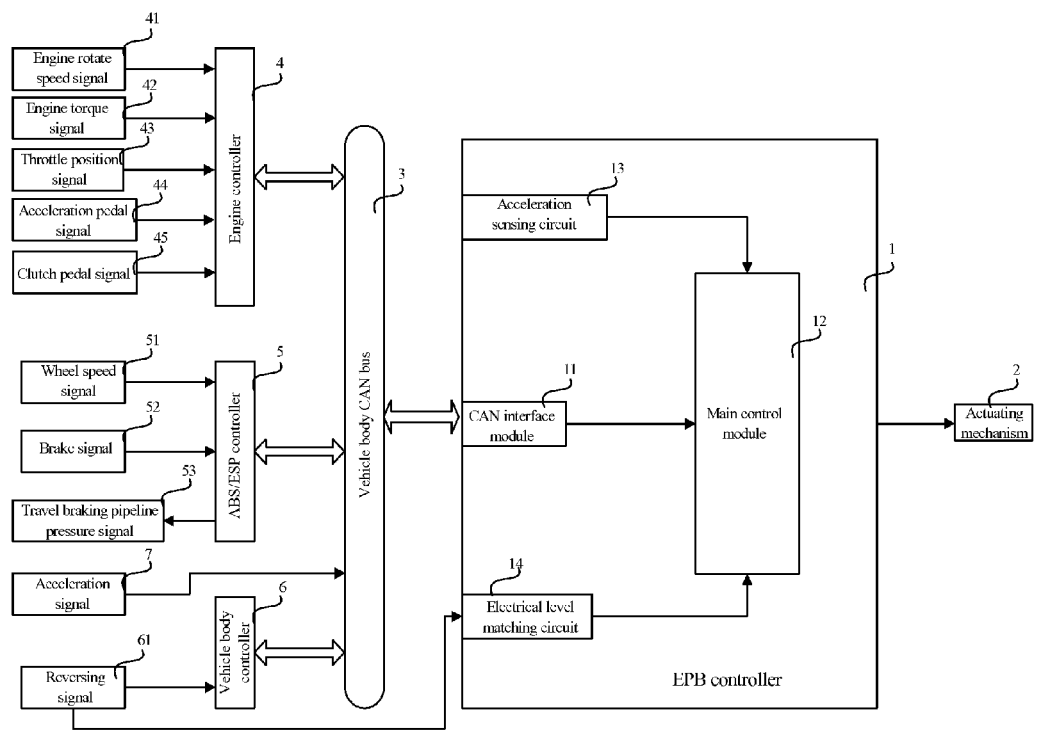
FIG. 2 is the connection diagram illustrating that the electronic parking brake system for a motor vehicle of the present invention is connected with the relevant part of a motor vehicle.

As shown in FIG. 1, an electronic parking brake system for a motor vehicle is provided. FIG. 2 is the connection diagram illustrating that the electronic parking brake system for motor vehicle of the present invention is connected with the relevant parts of motor vehicle; As shown in FIG. 1 in combination with FIG. 2, the electronic parking brake system for a motor vehicle comprises an EPB controller 1 and an actuating mechanism 2, wherein the EPB controller 1 comprises a controller area network (CAN for short) interface module 11 and a main control module 12; the main control module 12 comprises a main control unit 121, a storage unit 122 and one or more of calculation units 123.

With reference to FIG. 2, a vehicle body CAN bus is respectively connected with an engine controller 4, an antilock brake system (ABS for short)/electronic stability program (ESP for short controller 5 and a vehicle body controller 6, wherein the engine controller 4 is respectively connected with an engine rotate speed sensor, an engine torque sensor, a throttle position sensor and an accelerator pedal sensor to respectively obtain an engine rotate speed signal 41, an engine torque signal 42, an throttle position signal 43 and an accelerator pedal signal 44. The ESP/ABS controller 5 is respectively connected with a wheel speed sensor and a brake signal sensor to respectively obtain a wheel speed signal 51 and a brake signal 52. The acceleration sensor located in the other circuit or system (such as ESP system or safety gasbag) directly sends the acceleration signal from the vehicle body CAN bus 3 to the EPB controller 1. In addition, the acceleration signal can also be obtained from an acceleration sensing circuit 13 in the EPB controller 1. As shown in FIG. 2, the acceleration sensing circuit 13 is used to detect the acceleration of the motor vehicle and to send the detected acceleration signal to the main control unit 121.

The vehicle body controller 6 is connected with a reversing light circuit to control the on/off of the reversing light and to send the reversing signal 61 through the vehicle body CAN bus. In addition, the EPB controller also comprises an electrical level matching circuit 14, wherein the electrical level matching circuit is used to match the electrical level of the reversing signal 61 transmitted from the reversing light circuit into an acceptable electrical level to the main control unit 121 and to send the electrical acceptable level to the main control unit 121.

The CAN interface module 11 in the EPB controller 1 can transmit signals or commands between the vehicle body CAN bus 3 and the main control unit 12, wherein the CAN interface module 11 can receive all sensor signals or detection signals from the vehicle body CAN bus 3 and send these signals to the main control unit 12.

according to the received sensor signals or the detection signals, the main control unit 121 judges the type of the sensor signals or the detection signals, selects the corresponding calculation unit 123 to make calculation; according to the calculated results obtained by the calculation unit 123 or the sensor signals or detection signals received by the main control unit 121, the main control unit determines whether the current motor vehicle meets the condition for releasing the brake; when the condition for releasing the brake is satisfied, the main control unit controls the actuating mechanism 2 to operate and thus release the braking completed by the parking brake system; or through the CAN interface module 11, the main control unit sends to the ESP system of the motor vehicle by way of the vehicle body CAN bus 3 the command to release the braking pipeline pressure, so as to release the braking completed by ESP system. As shown in FIG. 2, the CAN interface module 11 sends command to the ABS/ESP controller 5 through the vehicle body CAN bus 3, and ABS/ESP controller 5 sends the driving brake pipeline pressure signal 53.

According to the sensor signals or the detection signals sent by the main control unit 121 as well as the relevant parameters in the storage unit 122, the one or more of calculation units make calculation, and the calculated results are provided to the main control unit to determine whether the condition for releasing brake is satisfied, so as to assist the driver in starting. The calculation unit 123 can be used to calculate different kinds of data. In the present invention, the calculation unit 123 can be torque calculation unit, inclination calculation unit, sub-acceleration calculation unit and vehicle body attitude calculation unit, etc. The specific description on the calculation unit will be given later.

All sensor signals or detection signals received by the CAN interface module from the vehicle body CAN bus, include a clutch pedal signal and a acceleration pedal signal, or a acceleration signal, or a engine rotate speed signal and a throttle position signal, or a wheel speed or rotate angle signal of the driving wheel; the CAN interface module also sends these signals to the main control unit 121 in the EPB controller 1, the main control unit 121 coordinates with the calculation units to process of obtained motor vehicle data, judge whether the motor vehicle has been engaged a gear and whether the clutch has started combination, without need for adding clutch position sensors and gear position sensors. When the motor vehicle has engaged a gear and the clutch has started combination, the power of the engine will be gradually transmitted to the driving wheel. When the starting condition for releasing brake is satisfied, EPB controller 1 controls the actuating mechanism 2 to release the parking brake or send the command of releasing brake pipeline pressure to the ESP/ABS controller 5 through the vehicle body CAN bus 3, so as to release the driving brake and achieve the objective of assistant starting.

The present invention provides an assistant starting method of said electronic parking brake system for a motor vehicle, wherein, the electronic parking brake system receives all sensor signals and detection signals of the motor vehicle; when any one of the following conditions is satisfied, the brake will be released to assist a driver in starting:

Condition (1): a torque $T_c$ transmitted by a clutch is calculated, and the calculated torque $T_c$ transmitted by the clutch is greater than a torque $T_n$ needed for starting the motor vehicle;

Condition (2): an engine rotate speed is greater than an engine idle speed, and an accelerator pedal and a clutch pedal are depressed simultaneously;

Condition (3): starting trend of the motor vehicle is detected;

Condition (4): the detected engine rotate speed is smaller than a first predetermined threshold value calculated according to a throttle opening data;

Condition (5): a detected rotate speed or angle of a driving wheel is greater than a predetermined threshold value of rotate speed or angle.

Concretely, with reference to the structure diagrams as shown in FIG. 1 and FIG. 2, detailed description is given on how the brake is released when any of said conditions is satisfied:

Regarding the condition (1), the most simple realization mode is as follows: in the block diagram as shown in FIG. 1, one of the calculation units is a torque calculation unit, the signals received by the main control unit 121 include the engine rotate speed signal 41 and the engine torque signal 42; according to equation (1) and some constants stored in the storage unit 122, such as the moment of inertia of the engine, it is feasible to calculate the torque $T_c$ currently transmitted by the clutch, $$T_c = T_e - I_e \cdot \alpha_e = T_e - I_e \cdot \frac{\Delta \omega_e}{\Delta t} = T_e - \frac{\pi}{30} \cdot I_e \cdot \frac{\Delta n_e}{\Delta t} \quad \text{equation (1)}$$

wherein, $T_c$ The torque transmitted by the clutch is the final calculated result;

$T_e$ The effective torque output by the engine, corresponding to the received engine torque signal 42;

$I_e$ The moment of inertia of the engine is a constant stored in the storage unit 122;

$\alpha_e$ The angular acceleration of the engine is an intermediate variable;

$\omega_e$ The angular speed of the engine is an intermediate variable;

$n_e$ The rotate speed of the engine, corresponding to the received engine rotate speed signal 41.

The storage unit 122 stores the corresponding table of the torque $T_n$ required for starting, the model of the motor vehicle, the gradient of the ground surface where the motor vehicle is located (the inclination α between the present position of the motor vehicle and the horizontal plane is used as a parameter) and the reversing signal etc., as shown in Table 1, the torque $T_n$ provided in this table is sufficient to guarantee that no sliding slope will occur under different kinds of conditions, and it is a value obtained through a series of tests. Through this corresponding table, the main control module 121 can select the torque $T_n$ required for starting according to the current condition, the main control module compares the calculated results obtained by a torque calculation unit and the selected torque $T_n$ required for starting; when the torque $T_c$ obtained by the torque calculation unit is greater than the torque $T_n$ required for starting, it is judged that the current motor vehicle meets the condition for releasing brake.

TABLE 1

| Model | Flat ground | α1 | | α2 | | ... | |
| --- | --- | --- | --- | --- | --- | --- | --- |
| | | Reversal | Forward direction | Reversal | Forward direction | Reversal | Forward direction |
| A | $T_{n0}$ | $T_{n1\alpha1}$ | $T_{n2\alpha1}$ | $T_{n1\alpha2}$ | $T_{n2\alpha2}$ | ... | ... |

Figure 3:
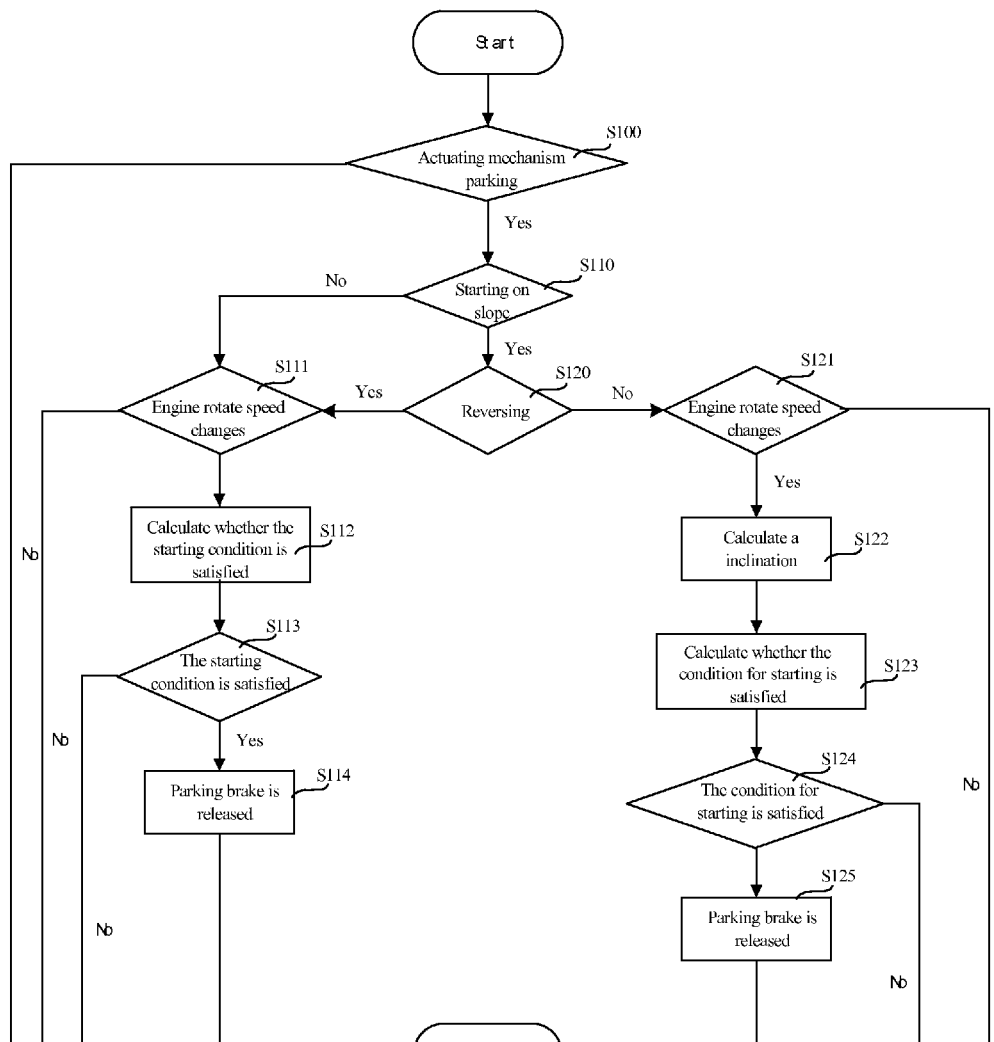
FIG. 3 is the flow chart illustrating an embodiment of the assistant starting method of the electronic parking brake system for a motor vehicle.

Once the model of the motor vehicle is fixed, it is negligible when selecting the torque $T_n$ required for starting. However, the gradient of the road surface where the motor vehicle is located and the driving direction (namely, reversing or forward direction) have significant influence on the selection of the torque $T_n$ required for starting. The torque $T_n$ required for starting varies depending on the value of gradient and the driving direction, namely reversal and forward driving. Therefore, as shown in FIG. 3, these two conditions are accounted for in an embodiment of the present invention. According to whether the condition (1) is satisfied, it is judged whether the brake is released to assistant starting.

At step S100: judge whether parking is completed by the actuating mechanism; if yes, implement the step S110; if no, this flow stops. It is noted that, this embodiment only describes the braking completed by the parking brake system. Of course, this embodiment can also describe the braking completed by ESP system. Since methods are similar, no repeated description will be provided herein.

Step S110: judge whether the motor vehicle is starting on slope. The specific judgment method: detect whether the acceleration signal is received; if acceleration signal can still be received in the process of braking, it is indicated that this motor vehicle stops on slope. If the motor vehicle is starting on slope, turn to step S120. If not, turn to step S111.

Step S111: judge whether there is change in the rotate speed of the engine; if any, implement the step S112; if no change, terminate.

Step S112: the main control unit 121 sends the received rotate speed and torque signals of the engine to the torque calculation unit, and the torque calculation unit makes calculation according to equation (1).

Step S113: select a specific data of the torque $T_n$ required for starting, and compare whether the $T_c$ calculated by the torque calculation unit according to equation (1) is greater than the torque $T_n$ required by starting. If yes, judge that the condition for starting is satisfied, and implement the step S114; if no, terminate.

Step S114: release parking.

Step S120: judge whether the reversing signal is received. Concretely, according to whether the signals sent from the reversing light circuit are received, judge whether the reversing signals are received. If yes, proceed to step S111, implement the flow from step S111 to step S114; if no, proceed to Step S121.

Step S121: judge whether there is change in the rotate speed of the engine; if any, implement the step S112; if no change, terminate.

Step S122: the main control unit 121 sends the received acceleration signal to the inclination calculation unit; the inclination calculation unit calculates the inclination α between the present position of the motor vehicle and the horizontal plane according to the acceleration signal; according to the inclination α, select a specific data of the torque $T_n$ required for starting, wherein the inclination α can be calculated through trigonometric function.

Step S123: the main control unit 121 sends the received rotate speed and torque signals of the engine to the torque calculation unit, and the torque calculation unit calculates the torque $T_c$ transmitted by the clutch according to equation (1).

Step S124: select a specific data of the torque $T_n$ required for starting, and compare whether the $T_c$ calculated by the torque calculation unit according to equation (1) is greater than the torque $T_n$ required by starting. If yes, judge that the condition for starting is satisfied, and implement the step S114; if no, terminate.

Step S125: release parking.

In addition, when EPB controller 1 has received the engine rotate speed signal through the vehicle body CAN bus 3, if the engine rotate speed is greater than the engine idle speed, it also simultaneously receives the clutch pedal signal 45 and the acceleration pedal signal 44; if the condition (2) is satisfied, release the braking to assist the driver in starting.

In the running process of the engine, if the main control module detects the clutch pedal and the acceleration pedal are depressed simultaneously, the main control module believes that the driver has the intention of starting, and then it is feasible to release braking. A switch is provided at the pedal of the clutch; when the clutch pedal is depressed, this switch sends a switching signal; when the main control module receives the switching signal, it is feasible to determine that the clutch pedal is depressed. After the motor vehicle has been started, the acceleration pedal will always output an electric signal; when the acceleration pedal is depressed, the electric signal will change. If the main control module detects any change in the electric signal, it can determine that the acceleration pedal is depressed.

By controlling the release of brake based on this control strategy, it is feasible to accurately judge the intention of the driver under most operating condition. Furthermore, it is feasible to release the brake prior to engagement of the clutch, so that the sliding wear of the clutch friction disc is reduced while the service life of the clutch is extended.

In addition to said method, the electronic parking brake system of the present invention receives all sensor signals from the motor vehicle. When it detects that the motor vehicle has the trend of starting, it releases brake to assist the driver in starting. Specifically, it judges whether the motor vehicle has the trend of starting according to the changes in the vehicle body acceleration or the vehicle body attitude.

The EPB controller 1 receives the vehicle body acceleration signals sent by the other electronic controller modules (such as ESP system) on the vehicle or obtains the vehicle body acceleration signal through its internal integrated acceleration sensing circuit 13.

When the vehicle is static and has not started, the main control unit 121 records the acceleration information of the vehicle along the vehicle body coordinate axes; at the time of starting, since the parking brake has not been released while the vehicle has engaged a gear, in the engagement process of the clutch, the power of the engine is transmitted to the front wheels; in the process that the wheel driving force is gradually increasing, since the particular suspension structure of the vehicle, in case of rear wheel lockup, certain acceleration will be generated on X-axis and Z-axis of vehicle body co-ordinates. Different acceleration threshold values are set according to different vehicles; when the X-axis acceleration reaches the threshold value, it releases brake (namely, when the acceleration in the direction of forward motion reaches the threshold value, it releases brake). In specific, one of the calculation units as shown in FIG. 1 is a sub-acceleration calculation unit and is used to decompose the obtained acceleration information into sub-acceleration signals on X-axis and Z axis in vehicle body co-ordinates; the main control unit 121 compares the sub-acceleration signal on X-axis as obtained by the sub-acceleration calculation unit with the threshold value stored in the storage unit; if the threshold value is reached, it is feasible to judge that the vehicle has the trend of starting.

In addition, shown in FIG. 1, one of the one or more of calculation units is a vehicle body attitude calculation unit, wherein the vehicle body attitude calculation unit decomposes the received acceleration signals into sub-acceleration signals in X-axis, Y-axis and Z-axis directions in the vehicle body coordinate system; according to the sub-acceleration signals in X-axis, Y-axis and Z-axis, it is feasible to obtain the current attitude data of the motor vehicle body. The main control unit 121 compares the current attitude data with the vehicle body attitude data in static state; when the vehicle body attitude change value reaches the threshold value, it is judged that this vehicle meets the condition for starting. There may be a good many kinds of attitude data, such as the inclination in the vehicle body coordinate system concretely refers to the inclination of three coordinate axes in the vehicle body coordinate system; the specific calculation method for these three inclinations is the same as the calculation method for the inclination α.

In addition to said method, the electronic parking brake system of the present invention receives all sensor signals from the motor vehicle; when the rotate speed of the engine is less than the first pre-determined threshold value, the brake is released to assist the driver in starting.

When the throttle opening of the motor is certain, the gas injection quantity of the engine basically remains constant, while the output power also remains constant. As observed from the following equation (2), when the engine output power is constant, the torque is inversely proportional to the rotate speed. When the motor vehicle has engaged a gear, in the process that the clutch is gradually engaged, the rotary resistance of the engine gradually increases; to maintain the engine rotate speed, the engine is required to increase the output torque. When the throttle opening remains unchanged, the engine rotate speed will gradually decrease when the engine torque is increased. According to this characteristic, In the present invention, the rotate speed threshold value can be calculated through the detected throttle opening data, namely the aforementioned first threshold value; when the rotate speed of the engine is less than the threshold value, it is judged that the clutch has been engaged, the condition for starting is satisfied, and it is feasible to release the brake.

$$P_e = T \cdot n_e \qquad \text{equation (2)}$$

$P_e$ The output power of the engine
T The output torque of the engine
$n_e$ The rotate speed of the engine In addition to said method, the electronic parking brake system of the present invention receives all sensor signals from the motor vehicle; when it detects that the value of wheel speed signal or rotate angle signal is greater than the pre-determined threshold value, it releases the braking to assist the driver in starting; wherein the threshold value is a constant preset value and is relevant with the vehicle model and the accuracy of the wheel speed sensor.

When the motor vehicle has engaged a gear, in the engagement process of the clutch, the power of the motor is transmitted to the driving wheel; when the driving force reaches the value required for starting, the driving wheel will generate rotate; the wheel speed sensor can detect the rotate direction and speed of the driving wheel and output the value of the wheel speed or rotate angle signal; according to the rotate direction of the driving wheel, it is feasible to judge whether the forward gear position or reversing gear position is currently engaged by the driver; according to the value of wheel speed or rotate angle, it is feasible to judge whether the condition for starting is satisfied; when the condition for starting is satisfied, the braking is released.

The EPB controller 1 of the electronic parking brake system has two methods for releasing the braking: when the braking is completed by the parking brake system, and any of the conditions (1)-(5) is satisfied, the EPB controller 1 controls the motor in the actuating mechanism 2 to rotate and release the braking; when the braking is completed by the ESP system of the motor vehicle, and any of the conditions (1)-(5) is satisfied, through the CAN interface module 11, the EPB controller 1 sends to the ESP system of the motor vehicle by way of the vehicle body CAN bus the command to release the braking pipeline pressure, so as to release the braking.

Wherein, the actuating mechanism 2 comprises a motor and a gear-down mechanism, and the gearing-down mechanism magnifies the output torque of the motor and applies the output torque to the parking brake through mechanical connection, so as to complete parking and parking release action.

In the electronic parking brake system, it is easy to judge the conditions for realizing automatic parking; when the engine speed is zero, it is feasible to realize parking, and any of problems cannot occur. However, it is relatively difficult to judge the conditions for realizing automatic release, because the potential safety hazards at the time of release shall be considered. Neither the sliding slope resulted from premature automatic release nor the flame-out of the engine/even the damage of transmission system due to too late automatic release is allowed. To judge whether automatic release can be performed, it is necessary to know whether the power has been transmitted to the vehicle wheels and whether this power is sufficient to ensure that no sliding-slope accident will occur. In order to determine whether the power has been transmitted to the wheels, it is necessary to additionally the mount clutch position sensor and the gear position sensor to obtain the clutch position signal and the gear position signal. As a result, not only the manufacturing cost is increased, it is still required to redesign the clutch control mechanism and gear shifting control mechanism to increase the clutch position sensor and the gear position sensor. Furthermore, in the use of clutch, the friction disc will be gradually abraded and its engagement point will be constantly changed, the error of the clutch position sensor will become increasingly higher, and the electronic parking brake system may easily make mistake in judging the driving intention of the driver, causing sliding slope or flame-out of the engine. The service life of the clutch will be significantly reduced over the long-term. However, in the application of the electronic parking brake system and assistant starting method thereof for a motor vehicle as provided by the present invention, there is no need to additionally a mount clutch position sensor and a gear position sensor; according to all the available sensor signals and detection signals on the motor vehicle, the system can accurately judge whether the brake can be automatically released, and there is no need to modify the existing motor vehicle, featuring low lost and accurate judgment.

In the end, it must be mentioned as follows: said embodiments are merely used to describe rather than limit the present invention; although detailed description of the present invention is provided with reference to the preferred embodiments, the common technical personnel of this field should understand that they could make modifications or equivalent substitutions on the present invention without going beyond the principle and scope of present invention. These modifications or equivalent substitutions should be included within the scope of claims of the present invention.

The invention claimed is:

1. An assistant starting method of electronic parking brake system for a motor vehicle, characterized in that, the electronic parking brake system receives all sensor signals and detection signals of the motor vehicle, and processes the received signals through a control unit therein, wherein the sensor signals received by the electronic parking brake system from the motor vehicle include an engine rotate speed signal, an effective torque signal output by an engine, a clutch pedal signal, an acceleration pedal signal, an acceleration signal, and a rotate speed or angle of a driving wheel, and wherein a torque Tc transmitted by a clutch is calculated by the control unit based on the engine rotate speed signal and the effective torque signal output by the engine; when any one of the following conditions is satisfied, the brake is released to assist a driver in starting:
   a first condition where the calculated torque $T_c$ transmitted by the clutch is greater than a torque $T_n$ needed for starting the motor vehicle;
   a second condition where an engine rotate speed is greater than an engine idle speed, and an accelerator pedal and a clutch pedal are depressed simultaneously;
   a third condition where starting trend of the motor vehicle is detected based on the acceleration signal;
   a fourth condition where the detected engine rotate speed is lower than a first predetermined threshold value calculated according to a throttle opening data;
   a fifth condition where a detected rotate speed or angle of the driving wheel is greater than a predetermined threshold value of rotate speed or angle.

2. The assistant starting method of electronic parking brake system for a motor vehicle of claim 1, characterized in that, the engine rotate speed signal is obtained from a sensor on the engine;
   under the first condition, the torque $T_c$ transmitted by the clutch is calculated by the control unit through the following first equation:

$$T_c = T_e - I_e \cdot \alpha_e = T_e - I_e \cdot \frac{\Delta \omega_e}{\Delta t} = T_e - \frac{\pi}{30} \cdot I_e \cdot \frac{\Delta n_e}{\Delta t}$$

wherein,
   $T_c$ the torque transmitted by the clutch is the final calculated result;
   $T_e$ the effective torque output by the engine, corresponding to the received engine torque signal;
   $I_e$ the moment of inertia of the engine is a constant stored in the storage unit;
   $\alpha_e$ the angular acceleration of the engine is an intermediate variable;
   $\omega_e$ the angular speed of the engine is an intermediate variable;
   $n_e$ the rotate speed of the engine, corresponding to the received engine rotate speed signal.

3. The assistant starting method of electronic parking brake system for a motor vehicle of claim 2, characterized in that, when the sensor signals received by the electronic parking brake system from the motor vehicle include an acceleration signal, detect whether it also has received a reversing signal; if no said reversing signal is received, according to the acceleration signal calculate, using the control unit, an inclination α between the current position of the motor and the horizontal plane; according to the inclination α, select the torque $T_n$ required for starting under the corresponding to the first condition.

4. The assistant starting method of electronic parking brake system for a motor vehicle of claim 3, characterized in that, the reversing signal is obtained by detecting the reversing light circuit.

5. The assistant starting method of electronic parking brake system for a motor vehicle of claim 1, characterized in that, the clutch pedal signal is sent by a clutch position switch on the clutch pedal and the acceleration pedal signal is sent by the acceleration pedal; under the second condition, when the electronic parking brake system has received the clutch pedal signal, it is judged that the clutch pedal is depressed; when there is change in the acceleration pedal signal, it is judged that the acceleration pedal is depressed.

6. The assistant starting method of electronic parking brake system for a motor vehicle of claim 1, characterized in that, under the third condition, it is detected that the motor vehicle has the trend of starting through the following steps:
   step 31: after having received the acceleration signal, the electronic parking brake system decomposes the acceleration signal into the sub-acceleration signals in X-axis and Z-axis directions in the vehicle body coordinate system;
   step 32: compares the sub-acceleration signal in X-axis direction with the threshold value of acceleration;
   step 33: when the sub-acceleration signal in the X-axis direction reaches the threshold value, it is judged that the motor vehicle has the trend of starting; or, under the third condition, it is detected that the motor vehicle has the trend of starting through the following steps:
   step 31': after having received the acceleration signal, the electronic parking brake system decomposes the acceleration signal into the sub-acceleration signals in X-axis, Y-axis, Z-axis directions in the vehicle body coordinate system;
   step 32': according to the sub-acceleration signals in the X-axis, Y-axis and Z-axis directions, obtain the current attitude data of the motor vehicle body;
   step 33': compares the current attitude data of the motor vehicle body with the attitude data of the motor vehicle body in static state, so as to obtain the attitude change value of the motor vehicle body;

step 34': when the attitude change value of the motor vehicle body reaches a threshold value, it is judged that the motor vehicle has the trend of starting.

7. The assistant starting method of electronic parking brake system for a motor vehicle of claim 1, characterized in that, the sensor signals received by the electronic parking brake system from the motor vehicle include an engine rotate speed signal obtained by the speed sensor on the engine and a throttle valve signal obtained by the throttle valve position sensor on the throttle valve body;
under the fourth condition, after having received the throttle valve signal, the electronic parking brake system calculates, using the control unit, the first pre-determined threshold value according to the opening data represented by the throttle valve signal; after having received the engine rotate speed signal, the electronic parking brake system compares, using the control unit, the rotate speed of the engine with the first pre-determined threshold value; when the rotate speed of the engine is less than the first pre-determined threshold value, the electronic parking brake system releases the braking.

8. The assistant starting method of electronic parking brake system for a motor vehicle of claim 1, characterized in that, the brake is released in the following mode:
when the braking is completed by the parking brake system, and any of the first through fifth conditions is satisfied, the electronic parking brake system releases the braking;
when the braking is completed by the ESP system of the motor vehicle, and any of the first through fifth conditions is satisfied, the electronic parking brake system sends the command to release a braking pipeline pressure to the ESP system, and the ESP system will release braking.

9. An electronic parking brake system for a motor vehicle, comprising an EPB controller and an actuating mechanism, characterized in that, the EPB controller also comprises a main control module and a CAN interface module, wherein the main control module includes a main control unit, a storage unit and one or more of calculation units;
wherein, the CAN interface module is designed to transmit signals or commands between the motor vehicle body CAN bus and the main control unit;
according to the received sensor signals or the detection signals, the main control unit judges the type of the sensor signals or the detection signals, selects the corresponding calculation unit to make calculation, wherein the received sensor signals include an engine rotate speed signal and an effective torque signal output by an engine, and the calculation includes calculating a torque $T_c$ transmitted by a clutch based on the engine rotate speed signal and the effective torque signal output by the engine; according to the calculated results obtained by the calculation unit or the sensor signals or detection signals received by the main control unit, the main control unit determines whether the current motor vehicle meets the condition for releasing the brake; when the condition for releasing the brake is satisfied, the main control unit controls the actuating mechanism to operate and thus release the braking completed by the parking brake system; or through the CAN interface module, the main control unit sends to the ESP system of the motor vehicle by way of the vehicle body CAN bus the command to release the braking pipeline pressure, so as to release the braking completed by ESP system;
according to the sensor signals or the detection signals sent by the main control unit as well as the relevant parameters in the storage unit, the one or more of calculation units make calculation, and the calculated results are provided to the main control unit to determine whether the condition for releasing brake is satisfied.

10. The electronic parking brake system for a motor vehicle of claim 9, characterized in that, the EPB controller also comprises an acceleration sensing circuit, wherein the acceleration sensing circuit is used to detect the acceleration of the motor vehicle and to send the detected acceleration signal to the main control unit.

11. The electronic parking brake system for a motor vehicle of claim 10, characterized in that, the EPB controller also comprises an electrical level matching circuit, wherein the electrical level matching circuit is connected with the reversing light circuit of the motor vehicle and is used to match the electrical level of the reversing signal transmitted from the reversing light circuit into an acceptable electrical level to the main control unit and to send the electrical acceptable level to the main control unit.

12. The electronic parking brake system for a motor vehicle of claim 11, characterized in that, one of the one or more of calculation units is a torque calculation unit,
wherein the torque calculation unit is used to calculate the torque $T_c$ transmitted by the clutch through the following first equation $$T_c = T_e - I_e \cdot \alpha_e = T_e - I_e \cdot \frac{\Delta \omega_e}{\Delta t} = T_e - \frac{\pi}{30} \cdot I_e \cdot \frac{\Delta n_e}{\Delta t}$$

wherein $T_e$ the effective torque output by the engine, corresponding to the received engine torque signal;
$I_e$ the moment of inertia of the engine is a constant stored in the storage unit;
$\alpha_e$ the angular acceleration of the engine is an intermediate variable;
$\omega_e$ the angular speed of the engine is an intermediate variable;
$n_e$ the rotation speed of the engine, corresponding to the received engine rotate speed signal, and
wherein, when the torque Tc calculated by the torque calculation unit is greater than a torque Tn required for starting, the main control unit determines that the current motor vehicle meets the condition for releasing the brake.

13. The electronic parking brake system for a motor vehicle of claim 12, characterized in that, one of the one or more of calculation units is an inclination calculation unit and is used to calculate an inclination α between the current position of the motor vehicle and the horizontal plane according to the acceleration signal.

14. The electronic parking brake system for a motor vehicle of claim 13, characterized in that, the storage unit stores the corresponding table of the torque $T_n$ required for starting, the model of the motor vehicle, the inclination α and the reversing signal; through this corresponding table, the main control module can select the torque $T_n$ required for starting according to the current condition, the main control module compares the calculated results obtained by a torque calculation unit and the selected torque $T_n$ required for starting; when the torque $T_c$ obtained by the torque calculation unit is greater than the torque $T_n$ required for starting, it is judged that the current motor vehicle meets the condition for releasing brake.

15. The electronic parking brake system for a motor vehicle of claim 9, characterized in that, one of the one or more of calculation units is a sub-acceleration calculation unit, wherein the sub-acceleration calculation unit is used to decompose the received acceleration signal into sub-acceleration signals in X-axis and Z-axis directions in the vehicle body coordinate system.

16. The electronic parking brake system for a motor vehicle of claim 14, characterized in that, the threshold value of the sub-acceleration in X-axis direction is stored in the storage unit, which is provided to the main control unit to compare the sub-acceleration signal in X-axis direction with the threshold value; when the sub-acceleration signal in the X-axis direction is greater than the threshold value, it is judged that the current motor vehicle meets the condition for releasing brake.

17. The electronic parking brake system for a motor vehicle of claim 10, characterized in that, one of the one or more of calculation units is a vehicle body attitude calculation unit, wherein the vehicle body attitude calculation unit decomposes the received acceleration signals into sub-acceleration signals in X-axis, Y-axis and Z-axis directions in the vehicle body coordinate system; according to the sub-acceleration signals in X-axis, Y-axis and Z-axis, the current attitude data of the motor vehicle body is obtainable.

18. The electronic parking brake system for a motor vehicle of claim 17, characterized in that, the storage unit also stores the vehicle body attitude data when the motor vehicle in static state and the threshold value of the vehicle body attitude change value; the main control unit compares the current attitude data with the vehicle body attitude data in static state; when the vehicle body attitude change value reaches the threshold value, it is judged that the current motor vehicle meets the condition for releasing brake.

19. The electronic parking brake system for a motor vehicle of claim 9, characterized in that, the actuating mechanism comprises a braking motor and a speed reducing mechanism connected with the braking motor, wherein the braking motor receives a command from the main control unit, makes the corresponding action according to the command; the speed reducing mechanism is connected with the parking brake.

20. The electronic parking brake system for a motor vehicle of claim 10, characterized in that, all sensor signals or detection signals received by the CAN interface module from the vehicle body CAN bus, include a clutch pedal signal and an acceleration pedal signal, or an acceleration signal, or an engine rotate speed signal and a throttle position signal, or a wheel speed or rotate angle signal of the driving wheel.

* * * * *